(12) United States Patent
Freudinger

(10) Patent No.: US 7,100,947 B2
(45) Date of Patent: Sep. 5, 2006

(54) TUBING AND CONNECTOR SYSTEM

(75) Inventor: Mark J. Freudinger, Peotone, IL (US)

(73) Assignee: Quantum Technical Services, Inc., Frankfort, IL (US)

( * ) Notice: Subject to any disclaimer, the term of this patent is extended or adjusted under 35 U.S.C. 154(b) by 13 days.

(21) Appl. No.: 10/943,423

(22) Filed: Sep. 17, 2004

(65) Prior Publication Data

US 2006/0061093 A1    Mar. 23, 2006

(51) Int. Cl.
*F16L 33/00* (2006.01)
(52) U.S. Cl. .................... 285/245; 285/903; 285/242
(58) Field of Classification Search ........... 285/903, 285/242, 245
See application file for complete search history.

(56) References Cited

U.S. PATENT DOCUMENTS

| | | | | | |
|---|---|---|---|---|---|
| 4,400,022 | A | * | 8/1983 | Wright | 285/256 |
| 4,457,544 | A | * | 7/1984 | Snow et al. | 285/251 |
| 4,625,998 | A | * | 12/1986 | Draudt et al. | 285/7 |
| 4,729,583 | A | * | 3/1988 | Lalikos et al. | 285/222.1 |
| 5,042,844 | A | * | 8/1991 | Iida et al. | 285/7 |
| 5,738,385 | A | * | 4/1998 | Homann et al. | 285/226 |
| 5,794,986 | A | * | 8/1998 | Gansel et al. | 285/148.16 |
| 5,984,375 | A | * | 11/1999 | Merrett | 285/253 |
| 6,209,929 | B1 | * | 4/2001 | Ikegami et al. | 285/139.2 |
| 6,581,979 | B1 | * | 6/2003 | Ikegami et al. | 285/256 |

FOREIGN PATENT DOCUMENTS

JP          2229988      *  9/1990  ............. 285/903

* cited by examiner

*Primary Examiner*—David Bochna
(74) *Attorney, Agent, or Firm*—Joseph H. Golant; Jones Day

(57) ABSTRACT

A tubing and connector system including a plastic tubing or hose having a helical outer surface, a plastic lock nut having a helical internal surface with the same thread pitch as the pitch of the tubing outer surface, and a fitting having several barbs formed on its outer surface. The tubing and connector system has few parts and is easy to assemble by having the inner surface of the tubing engage the barbs of the fitting, and the lock nut, being mounted on the outer surface of the tubing, is rotated over the tubing and the fitting so as to squeeze the tubing between the lock nut and the fitting. Disassembly for washing is also easily accomplished by backing the lock nut away from the fitting and pulling the tubing off of the fitting.

7 Claims, 3 Drawing Sheets

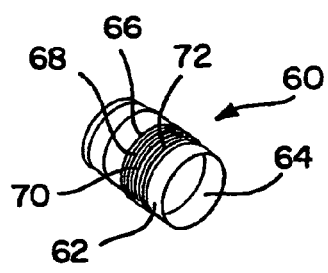
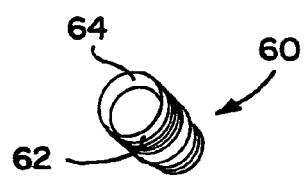
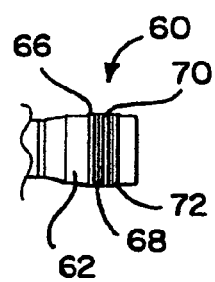
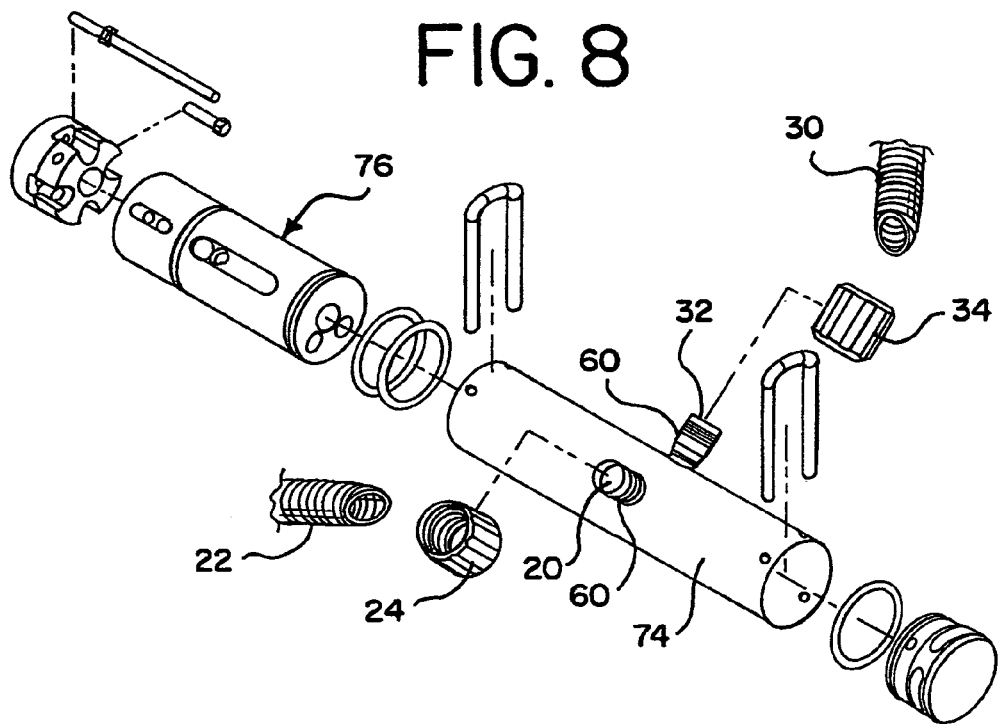
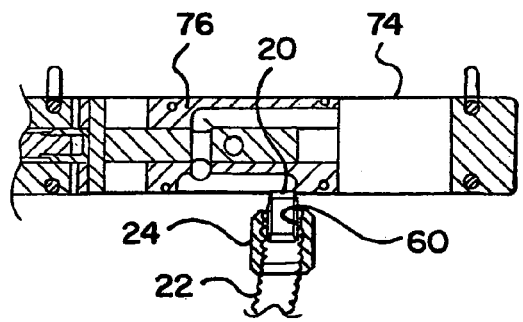

TUBING AND CONNECTOR SYSTEM

CROSS REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to a tubing and connector system and more particularly to a simple tubing and connector system that is made of few parts and is easy to disassemble and wash.

2. Description of the Related Art

Hoses and related couplers, especially those used on food processing equipment, tend to be relatively expensive and of complicated design. Thus, they are not easy to disassemble in a complete fashion or to wash as required or as desirable. The complicated structure of these hoses and connectors not only makes the combination expensive but provides nooks and crannies that are breeding locations for bacteria. These same nooks and crannies make washing prolonged and difficult.

Devices that have been made to completely disassemble may require clamps and these too tend to be expensive and complicated and often require tools for assembly and disassembly.

BRIEF SUMMARY OF THE INVENTION

The difficulties encountered with previous devices have been over come by the present invention. What is described here is a tubing and connector system including plastic tubing, the tubing having an outer surface and an inner surface, a lock nut having an outer surface and an inner surface, and a fitting. The lock nut engages the outer surface of the tubing to squeeze the tubing between the lock nut and the fitting.

There are a number of advantages, features and objects achieved with the present invention which are believed not to be available in earlier related devices. For example, two advantages are that the system is simply constructed and includes very few parts. The system features parts which are inexpensive and they are of a smooth and simple design. This meets the objects of ease of disassembly and allows quick and easy washing of the individual parts. The system is reuseable and the tubing and/or the lock nut may be easily replaced if damaged or worn. In spite of its simple construction, the system is robust and very reliable.

A complete understanding of the present invention and other objects, advantages and features thereof will be gained from a consideration of the present specification which provides a written description of the invention, and of the manner and process of making and using the invention, set forth in such full, clear, concise, and exact terms as to enable any person skilled in the art to which it pertains, or with which it is most nearly connected, to make and use the same in compliance with Title 35 U.S.C. section 112 (first paragraph). Furthermore, the following description of a preferred embodiment of the invention read in conjunction with the accompanying drawing provided herein represents an example of the invention in compliance with Title 35 U.S.C. section 112 (first paragraph), but the invention itself is defined in the claims section attached hereto.

BRIEF DESCRIPTION OF THE SEVERAL VIEWS OF THE DRAWING

FIG. 5 is a front isometric view of a barbed fitting.

FIG. 6 is another isometric view of the barbed fitting.

FIG. 7 is an elevation view of the barbed fitting shown attached to the device shown in FIG. 1.

FIG. 8 is an exploded isometric view of a portion of the device shown in FIG. 1 including a product cylinder, a product piston, an intake fitting, an outlet fitting, an intake lock nut, an outlet lock nut, an intake tubing and an outlet tubing.

FIG. 9 is a sectional view of the portion of the device shown in FIG. 8 in an assembled configuration.

DETAILED DESCRIPTION OF A PREFERRED EMBODIMENT OF THE INVENTION

Figure 1:
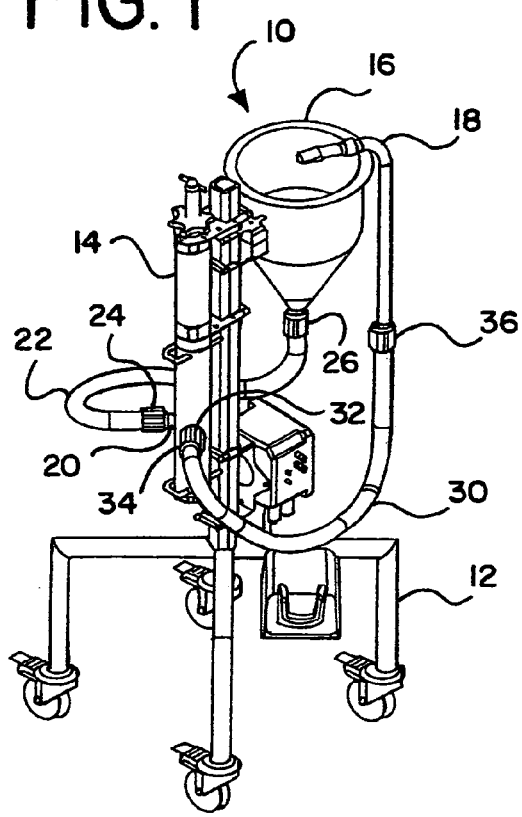
FIG. 1 is an isometric view of an adjustable metering and dispensing pump device for use in food processing.

While the present invention is open to various modifications and alternative constructions, the preferred embodiment illustrating the best mode contemplated by the inventor of carrying out his invention is shown in the various figures of the drawing and will be described herein in detail, pursuant to Title 35 U.S.C. section 112 (first paragraph). It is understood, however, that there is no intention to limit the invention to the particular embodiment, form or example which is disclosed herein. To the contrary, the intention is to cover all modifications, equivalent structures and methods, and alternative constructions falling within the spirit and scope of the invention as expressed in the appended claims section attached hereto, pursuant to Title 35 U.S.C. section 112 (second paragraph).

The tubing and connector system disclosed here may be used in an adjustable metering and dispensing device 10 as shown in FIG. 1. Such a device may include a frame or stand 12, a pump apparatus 14, a hopper 16 and a dispensing nozzle 18. The metering and dispensing device may be used, for example, to dispense a metered amount of tomato sauce onto pizza crust in a pizza-making operation. Typically, such equipment must be disassembled and washed on a daily basis to meet health requirements.

Communicating the hopper 16 to an inlet 20 of the pump apparatus 14 is a length of tubing or hose 22 with a lock nut 24, 26 at each end of the tubing. A second length of tubing or hose 30 communicates an outlet 32 of the pump apparatus 14 and the dispensing nozzle 18, the tubing 30 also having a lock nut 34, 36 at each end. The adjustable metering and dispensing device 10 is more fully described in co-pending application Ser. No. 10/936,110 filed on Sep. 8, 2004. and entitled Food Metering And Dispensing Device, by the same inventor as the subject application and assigned to the same assignee. This application is incorporated herein by reference.

Figure 2:
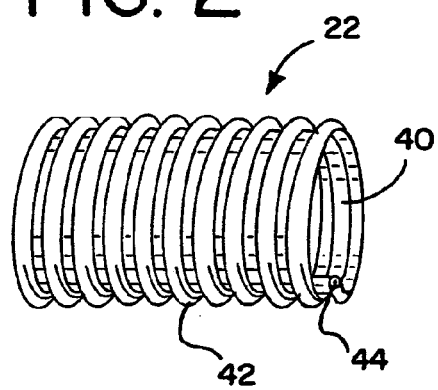
FIG. 2 is an isometric view of tubing that is used on the device shown in FIG. 1.

Referring now to FIG. 2, the tubing 22 is shown in more detail. The tubing or hose 22 and the tubing or hose 30 are identical and may have been cut to a desired length from a supply spool as needed. The tubing has a smooth base or inner surface 40 and a helical or spiral outer surface 31. Formed in the tubing is a plastic helix 44, which is wire-like in appearance. The outer surface is sometimes referred to as "convoluted." The helix also has a pitch, defined as the distance in an axial direction between a point on a coil of the helix to a point on the next coil of the helix after moving along the helix for 360 degrees.

The body of the tubing is made from PVC as is the helix, and other suitable plastics, such as polyurethane, polyolefin, nylon, fluoropolymers or rubber may be used. The helix may be formed of metal, such as stainless steel or non-stainless steel. Such a tubing is commercially available and meets FDA requirements for use with food and beverage (NSF-51 and 61) and with meat, poultry and dairy. For purposes of the metering and dispensing device shown in FIG. 1 the hoses 22, 30 have a one inch internal diameter. Of course, other sizes may be found to be suitable.

Figure 3:
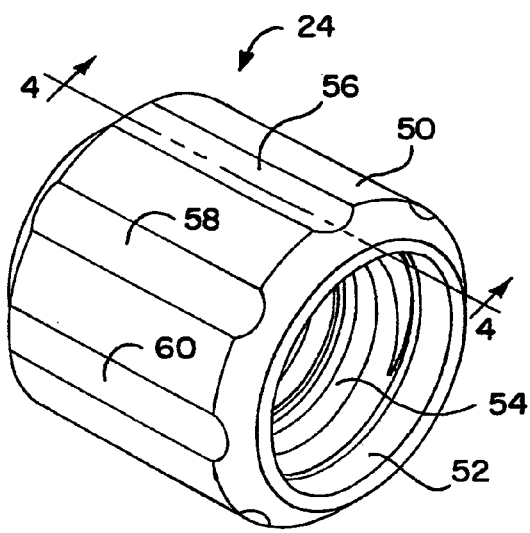
FIG. 3 is an isometric view of a lock nut used with the tubing on the device shown in FIG. 1.
Figure 4:
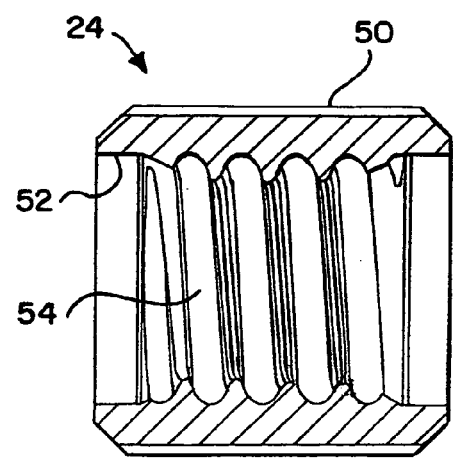
FIG. 4 is a sectional view taken along line 4—4 of FIG. 3.
Figure 10:
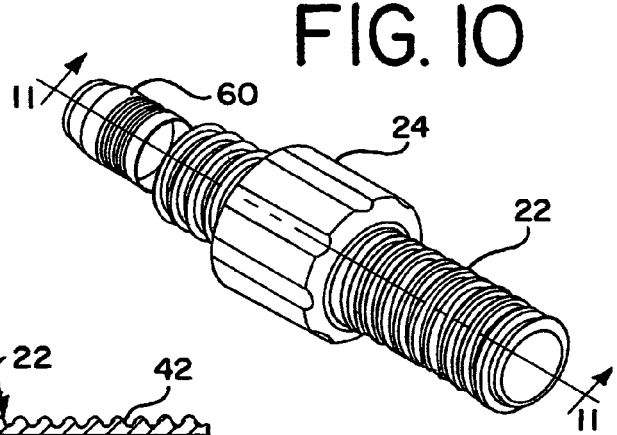
FIG. 10 is a partially exploded isometric view of the tubing and connector system.
Figure 12:
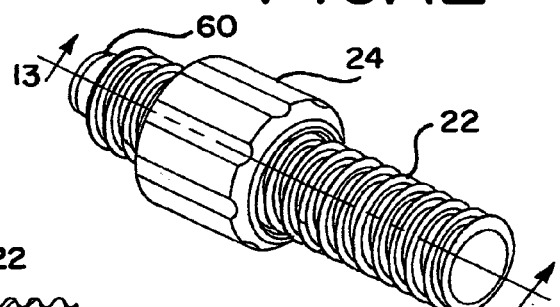
FIG. 12 is an isometric view of the tubing in engagement with the fitting.
Figure 14:
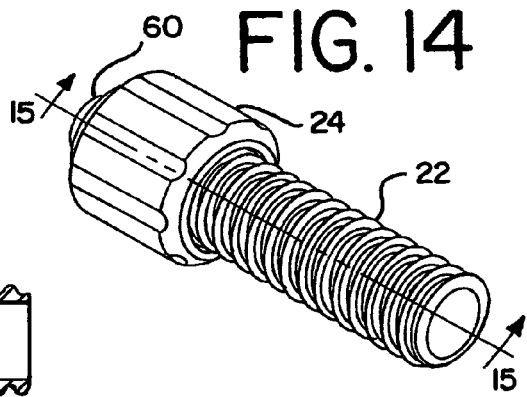
FIG. 14 is an isometric view of the tubing and connector system fully engaged with the lock nut tightened over the tubing and fitting.

The lock nut 24, FIGS. 3 and 4 which is identical to the other three lock nuts 26, 34 and 36, has an outer surface 50 and an inner surface 52. On the inner surface is a smooth screw thread 54 with the same pitch as the helical outer surface 42 of the tubing 22. The outer surface 50 of the lock nut includes axially directed grooves, such as grooves 56, 58, 60 to provide for an improved grip to facilitate rotating the lock nut. The inner surface 52 has the same dimensions as the outer surface 42 of the tubing and is structured to be mounted on the tubing outer surface as shown in FIGS. 10, 12 and 14.

The lock nut may be machined from a block of UHMW polyethylene or may be molded of any suitable plastic. For the metering and dispensing device 10 shown in FIG. 1 the lock nut has an outside diameter of two and three eighths inches, a length of two inches, a thread major diameter of about 1.42 inches, a thread minor diameter of about 1.12 inches and a pitch of about 0.300. As can be now appreciated the lock nut is constructed to move along the helical structure of the tubing outer surface as shown in FIGS. 10, 12 and 14.

Figure 13:
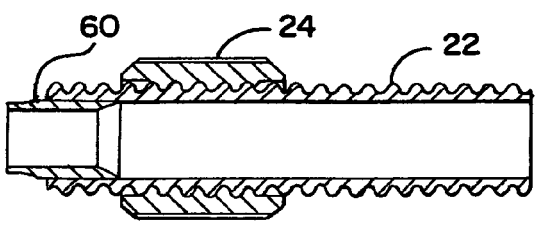
FIG. 13 is a sectional view taken along line 13—13 of FIG. 12.

Referring now to FIGS. 5–7 there is illustrated a barbed fitting 60 having an outer surface 62, and a smooth inner surface 64. Located on the outer surface are four barbs 66, 68, 70, 72 which extend slightly beyond the diameter of the outer surface. The fitting is made of stainless steel and is welded to the inlet 20 and the outlet 32 of a cylinder 74 as shown in FIGS. 8 and 9. The fitting may also be made of non-stainless steel or a plastic such as PVC. If plastic is used, an adhesive may be used to attach the fitting to another object such as the cylinder or a container like the hopper 16. Another variation of the fitting has a threaded end which allows the fitting to be threadedly engaged to the other object. The fitting receives the tubing as shown in FIG. 13 and there is engagement between the inner surface of the tubing and the barbs. The tubing is distorted somewhat and enlarged.

For the metering and dispensing device 10 shown in FIG. 1, the outer diameter of the fitting is about one inch. Like the tubing, barbed fittings are commercially available or may be custom-made like the lock nut. Orders for commercial products may be placed on the website, McMaster.com. As can be appreciated, the tubing, lock nut and fitting are simple, reliable and inexpensive. Hence, the system is very inexpensive when compared to existing hose and coupler combinations.

Referring back to FIGS. 8 and 9, a portion of the pump apparatus 14 is shown in both an exploded view (FIG. 8) and an assembled view (FIG. 9) and illustrates the three parts of the tubing and connector system, namely the fitting, the tubing and the lock nut. In FIG. 8 fittings 60 are shown welded to a stainless steel product cylinder 74 in which reciprocates a product piston 76 for pumping pizza sauce from the hopper to the nozzle.

Figure 11:
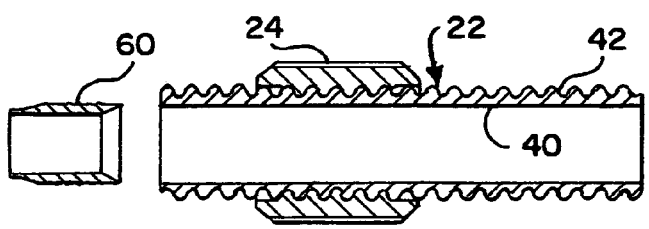
FIG. 11 is a sectional view taken along line 11—11 of FIG. 10.

The operation of the tubing and connector system is graphically illustrated in FIGS. 10–15. FIGS. 10 and 11 illustrate diagrammatically the lock nut 24 mounted rotatably on the outer surface 42 of the tubing 22 and the tubing approaching but not yet connected to the fitting 60.

In FIGS. 12 and 13 the tubing is engaged with the fitting. At this engagement the barbs of the fitting contact the inner surface of the tubing and expand the tubing slightly.

Figure 15:
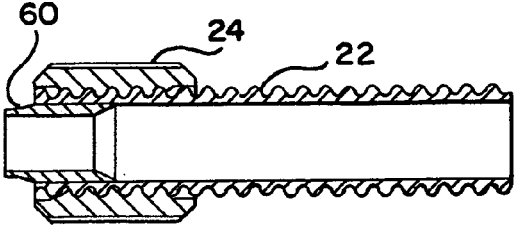
FIG. 15 is a sectional view taken along line 15—15 of FIG. 14.

In FIGS. 14 and 15 the lock nut 24 has been rotated axially along the tubing 22 toward the fitting 60 so as to squeeze the end of the tubing tightly around the fitting. Compression of the tubing ensuring a tight connection between the tubing and the fitting and is simple, reliable and robust. It may now be appreciated the ease by which a connection is made. A disconnect or disassembly is made just as easily by rotating the lock nut away from the fitting and pulling the tubing from the fitting. These steps can all be accomplished easily by hand without the use of any tools.

Returning to FIG. 8, the exploded view of the pump apparatus exemplifies the separation of the parts of the tubing and connector system allowing those parts which have been in contact with food, such as the product piston, the product cylinder (with the fittings) and the tubings along with the lock nuts to be separated and easily washed. The tubings, for example, can be totally separated for a thorough washing inside and out. It is noted that there are no nooks or crannies or hidden surfaces, folds or corners which cannot be reached by soapy water simply by dunking the items, or reached with a brush for interior reaming. Ease of washing enhances the economics of the system by reducing the time needed to meet relevant laws and regulations. Also, should the tubing wear or receive damage, a new piece can easily and cheaply be substituted. Furthermore, if only the ends are worn, they may be cut off. The tubing can continued to be used as long as sufficient length is still available.

The above specification describes in detail a preferred embodiment of the present invention. Other examples, embodiments, modifications and variations will, under both the literal claim language and the doctrine of equivalents, come within the scope of the invention defined by the appended claims. For example, as already mentioned, the lock nut and tubing may be made from a material other than PVC and UHMW and the fitting may be made from material other than metal. Furthermore the number of barbs and/or their dimensions may be altered, the gripping portion of the outer surface of the lock nut may also be changed as may the pitch of the lock nut and the helical outer surface of the tubing. Other changes could also occur. For example, the fitting may have a tapered or compound tapered outer surface without barbs, and the lock nut may have no thread on its inner surface. Other projection and groove configurations may be substituted as well. These are all still considered equivalent structures and will also come within the literal language of the claims. Still other alternatives will also be equivalent as will many new technologies. There is no desire or intention here to limit in any way the application of the doctrine of equivalents nor to limit or restrict the scope of the invention.

The invention claimed is:

1. A tubing and connector system for a food handling system comprising:

a length of tubing, said tubing having a consistent repeated geometry in an axial direction, the geometry including a generally smooth, constant diameter inner surface and a helical outer surface;

a lock nut having a threaded inner surface complementing the helical outer surface of said tubing to enable rotation of said lock nut directly on and along said length of outer surface of said tubing, said lock nut having an absence of internal barriers to prevent continuous rotation of said lock nut along said tubing, and said lock nut having generally identical end portions and a generally consistent geometry in an axial direction; and a fitting for connection to a food handling apparatus, said fitting having a generally smooth inner surface and a barbed outer surface to engage a portion of said generally smooth inner surface of said tubing and to distort said tubing wherein upon rotating said lock nut along the outer surface of said tubing to a location over the portion of the tubing inner surface engaging the fitting, the tubing is compressed between said fitting and said lock nut.

2. The system of claim 1 wherein:

said outer surface of said lock nut includes recesses.

3. The system of claim 2 wherein:

said outer surface of said lock nut includes a plurality of spaced apart axially directed grooves.

4. The system of claim 1 wherein:

said lock nut is formed of plastic material.

5. The system of claim 1 wherein:

each of the end portions of said lock nut has an enlarged opening for receiving said tubing.

6. The system of claim 5 wherein:

said lock nut includes an outer surface having axially directed grooves extending generally the axial length of said lock nut.

7. The system of claim 1 wherein:

said lock nut includes an outer surface having axially directed grooves extending generally the axial length of said lock nut.

* * * * *